(12) United States Patent
Tanaka et al.

(10) Patent No.: US 6,913,124 B2
(45) Date of Patent: Jul. 5, 2005

(54) VIBRATION INHIBITING STRUCTURE FOR ROTOR

(75) Inventors: Toshio Tanaka, Shizuoka (JP); Michiya Hayashi, Shizuoka (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 10/227,260

(22) Filed: Aug. 22, 2002

(65) Prior Publication Data
US 2003/0037999 A1 Feb. 27, 2003

(30) Foreign Application Priority Data

Aug. 23, 2001 (JP) ........................................ 2001-252426
May 15, 2002 (JP) ........................................ 2002-139844

(51) Int. Cl.[7] ............................................. F16D 65/10
(52) U.S. Cl. ............................. 188/218 XK; 188/218 A
(58) Field of Search ................................. 188/17, 18 R, 188/18 A, 73.1, 73.32, 73.36–73.38, 77 W, 218 XL, 218 R, 205 A, 250 E, 379, 380; 267/204, 136, 140.11; 74/574

(56) References Cited

U.S. PATENT DOCUMENTS

| | | | | |
|---|---|---|---|---|
| 2,012,838 A | * | 8/1935 | Tilden | .................... 188/218 A |
| 2,197,583 A | * | 4/1940 | Koeppen et al. | ............ 301/6.91 |
| 2,941,631 A | * | 6/1960 | Fosberry et al. | ......... 188/218 A |
| 3,286,799 A | * | 11/1966 | Shilton | .................... 188/218 R |
| 3,611,830 A | * | 10/1971 | Shank | .......................... 74/574 |
| 3,774,473 A | * | 11/1973 | Mitchell | ....................... 74/574 |
| 4,043,431 A | * | 8/1977 | Ellege | .......................... 188/379 |
| 4,667,760 A | | 5/1987 | Takimoto | |
| 4,719,984 A | | 1/1988 | Watanabe | |
| 5,211,256 A | | 5/1993 | Muramatsu | |
| 5,361,864 A | | 11/1994 | Tanaka | |
| 5,855,257 A | * | 1/1999 | Wickert et al. | ........ 188/218 XL |
| 6,626,273 B1 | * | 9/2003 | Baumgartner et al. | .. 188/264 A |
| 6,631,791 B2 | * | 10/2003 | Moore et al. | ........... 188/1.11 W |
| 6,640,937 B2 | * | 11/2003 | Bunker | ....................... 188/18 A |

FOREIGN PATENT DOCUMENTS

| | | |
|---|---|---|
| EP | 0688969 A1 * | 12/1995 |
| JP | 55-136902 | 9/1980 |
| JP | 59-141236 | 9/1984 |
| JP | 64-17038 | 1/1989 |

* cited by examiner

Primary Examiner—Christopher P. Schwartz
(74) Attorney, Agent, or Firm—Knobbe, Martens, Olson & Bear, LLP

(57) ABSTRACT

A rotor such as a brake disk for a vehicle has a spring holder that circumferentially extends around an axis of the disk. A coil spring extends around the axis along the spring holder. The spring is loaded onto the spring holder by its own resilience. The spring has a load rate that generates a tension that allows the spring to move circumferentially relative to the spring holder.

23 Claims, 7 Drawing Sheets

US 6,913,124 B2

VIBRATION INHIBITING STRUCTURE FOR ROTOR

PRIORITY INFORMATION

This application is based on and claims priority to Japanese Patent Applications No. 2001-252426, filed Aug. 23, 2001, and No. 2002-139844, filed May 15, 2002, the entire contents of which are hereby expressly incorporated by reference.

BACKGROUND OF THE INVENTION

1. Field of the Invention

The present invention is directed to a vibration inhibiting device for a rotor, and more particularly to a vibration inhibiting device for a rotor such as a brake disk.

2. Description of Related Art

Disk brakes are widely used in the automotive arts for braking systems. Recently, more motorcycles have been offered with disk brakes. This type of brake device provides better braking performance for many automotive applications.

Disk brakes, however, can generate a vibrational noise, such as a squeak, during operation. One cause of brake squeak is natural vibration of the brake disk. That is, vibration of a brake disk that occurs in a rotating direction thereof makes the brake squeak.

In order to inhibit brake squeak, various vibration inhibiting structures have been used with disk brake devices. For example, Japanese Utility Model Publications Nos. 57-59224, 59-141236 and 64-17038 disclose such vibration inhibiting structures. The disclosed structures include a brake disk with a circumferentially formed groove, a stiff ring fitted into the groove, and a tensioner that tensions the ring around the groove.

The ring can have a round shape or rectangular shape in cross-section and is circularly or endlessly formed or is configured in a "C" shape. If the ring is endlessly formed, the tensioner can be pins inserted between the ring and the disk (see Japanese Utility Model Publication No. 64-17038). If the ring is configured as "C", the tensioner can be a U-shaped fastener or a tension spring both tightly connecting distal ends with each other (see Japanese Utility Model Publications Nos. 57-59224, 59-141236, respectively).

Motorcycle brakes can be provided with a dynamic damper. The dynamic damper can include one or more weights affixed to a surface of the brake disk via elastic or resilient members such as, for example, rubber members. The dynamic damper can effectively inhibit brake squeak associated with motorcycle brake squeak.

However, dynamic dampers require accurately weighted and positioned elastic members. Additionally, the elastic members must be manufactured with precise load rates or spring constants. Thus, such a dynamic damper is costly. Additionally, dynamic dampers typically are effective only for a specific frequency range adapted to the specific arrangement. Under the particular circumstances, the dynamic damper should be rearranged if the natural vibration of the brake disk varies, such as if the thickness of the brake disc was decreased through wear or for repair.

SUMMARY OF THE INVENTION

One aspect of the present invention includes the realization that conventional vibration inhibiting devices do not sufficiently inhibit brake squeak because the devices are too stiff and/or are connected to the brake disc with too much tension. Thus, the prior art vibration inhibiting rings reduce squeak noise only over a limited frequency range. In addition, disk brake devices for motorcycles have different constructions from those of automobiles. The conventionally structured disk brake devices are not suitable for motorcycles accordingly.

In general, rotors other than the brake disks can make sound like brake squeak because the rotors inherently have their own natural vibrations.

A need therefore exists for an improved vibration inhibiting structure for a rotor that has simplicity and can be suitable for a broad frequency range of the natural vibration of the rotor.

In accordance with one aspect of the present invention, a rotor is mounted for rotation about an axis and comprises a holder that extends in a rotating direction of the rotor. An annular resilient member extends along the holder. The resilient member is loaded onto the holder by its own resilience. The resilient member has a load rate that generates a tension that allows the resilient member to move in the rotating direction relative to the holder.

In accordance with another aspect of the present invention, a brake disk for a vehicle comprises a spring holder that circumferentially extends around an axis of the disk. A spring extends around the axis along the spring holder. The spring is loaded onto the spring holder by its own resilience. The spring has a load rate that generates a tension that allows the spring to move circumferentially relative to the spring holder.

In accordance with yet another aspect of the present invention, a disk brake assembly for a vehicle comprises a rotor assembly configured to be rotationally coupled to a wheel of a vehicle. A vibration attenuation member contacts the rotor and including means for biasing the member into contact with the rotor and allowing the member to rotate relative to the rotor.

BRIEF DESCRIPTION OF THE DRAWINGS

These and other features, aspects and advantages of the present invention will now be described with reference to the drawings of several preferred embodiments, which are intended to illustrate and not to limit the invention. The drawings comprise seven figures.

DETAILED DESCRIPTION OF THE PREFERRED EMBODIMENTS OF THE INVENTION

Figure 1:
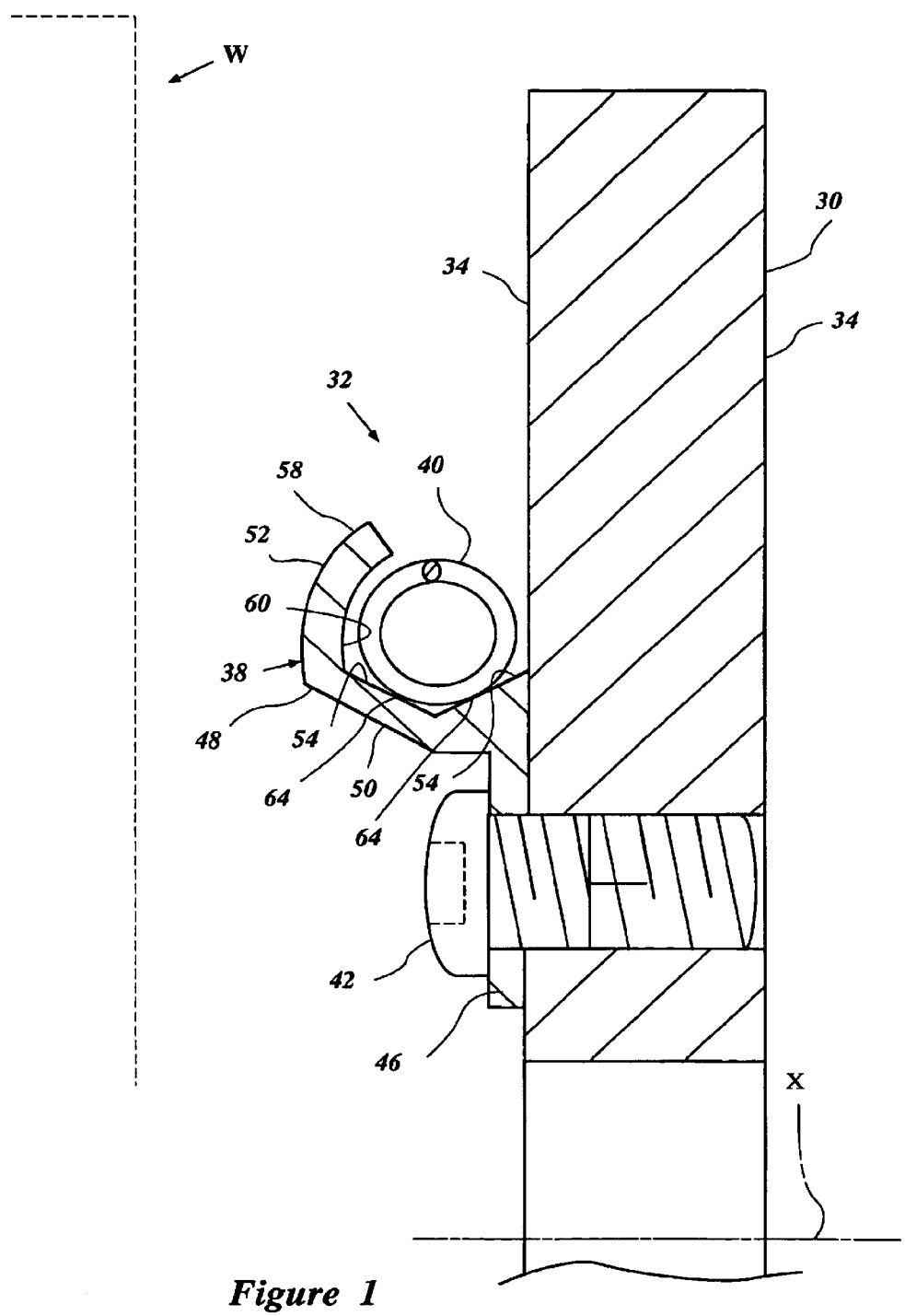
FIG. 1 is a partial cross-sectional view of a vibration inhibiting structure for a brake disk of a motorcycle configured in accordance with a preferred embodiment. The cross-section is taken along a plane extending through the center axis of the brake disk.

With reference to FIG. 1, a brake disk 30 having a vibration inhibiting structure 32 is described below. The brake disk 30 has particular utility in the context of a motorcycle, and thus is described in the context of the motorcycle to illustrate one preferred environment of use. The brake disk 30, however, can be used with other types of vehicles such as for, example, all terrain vehicles and automobiles. Furthermore, the vibration inhibiting structure 32 can be applied to various rotors such as, for example, an output shaft of an engine. The vibration inhibiting structures described below, i.e., not only the structure 32 but also all modified or alternative structures, are most suitable for rotors that rotate with speeds under 1,000 rpm.

The brake disk 30 is affixed to a wheel hub (not shown) of either front or rear wheel W of a motorcycle, or both of the wheels by fasteners such as bolts. The brake disk 30 rotates about the center axis X thereof when the wheel W rotates. The brake disk 30 preferably is made of stainless steel.

Figure 3:
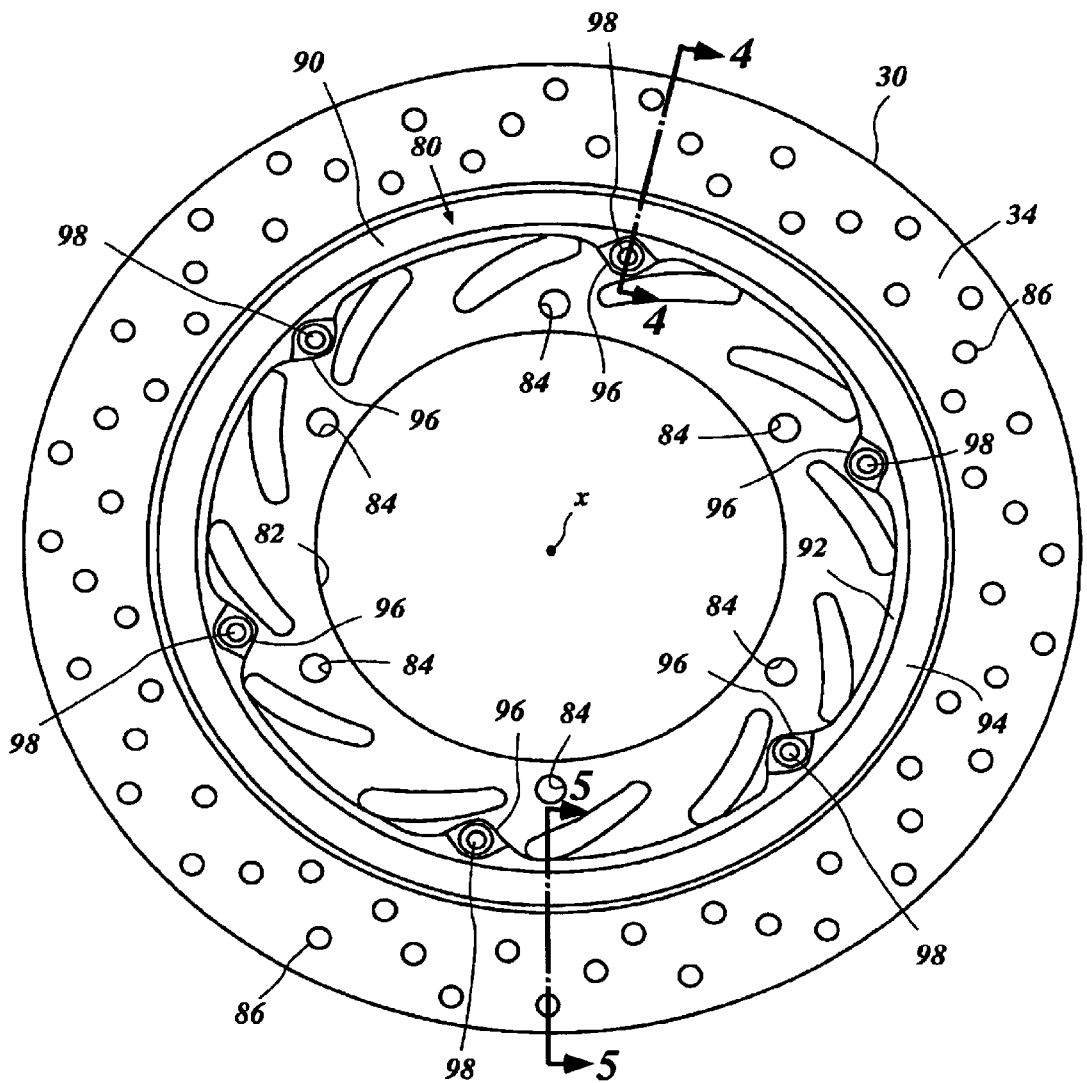
FIG. 3 is a side elevational view of another vibration inhibiting structure for a brake disk of a motorcycle configured in accordance with another embodiment.
Figure 4:
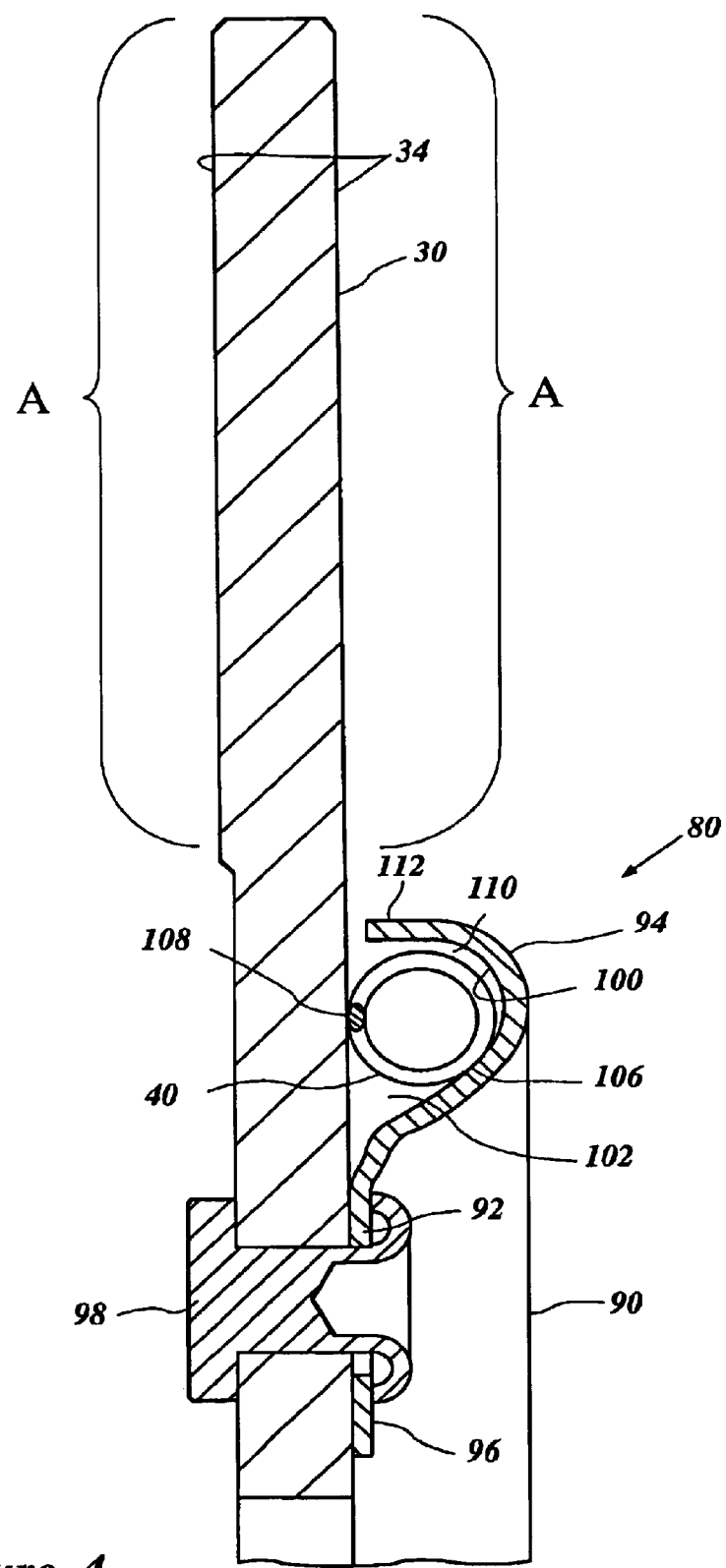
FIG. 4 is a partial cross-sectional view of the vibration inhibiting structure of FIG. 3 taken along the line 4—4 of FIG. 3.
Figure 5:
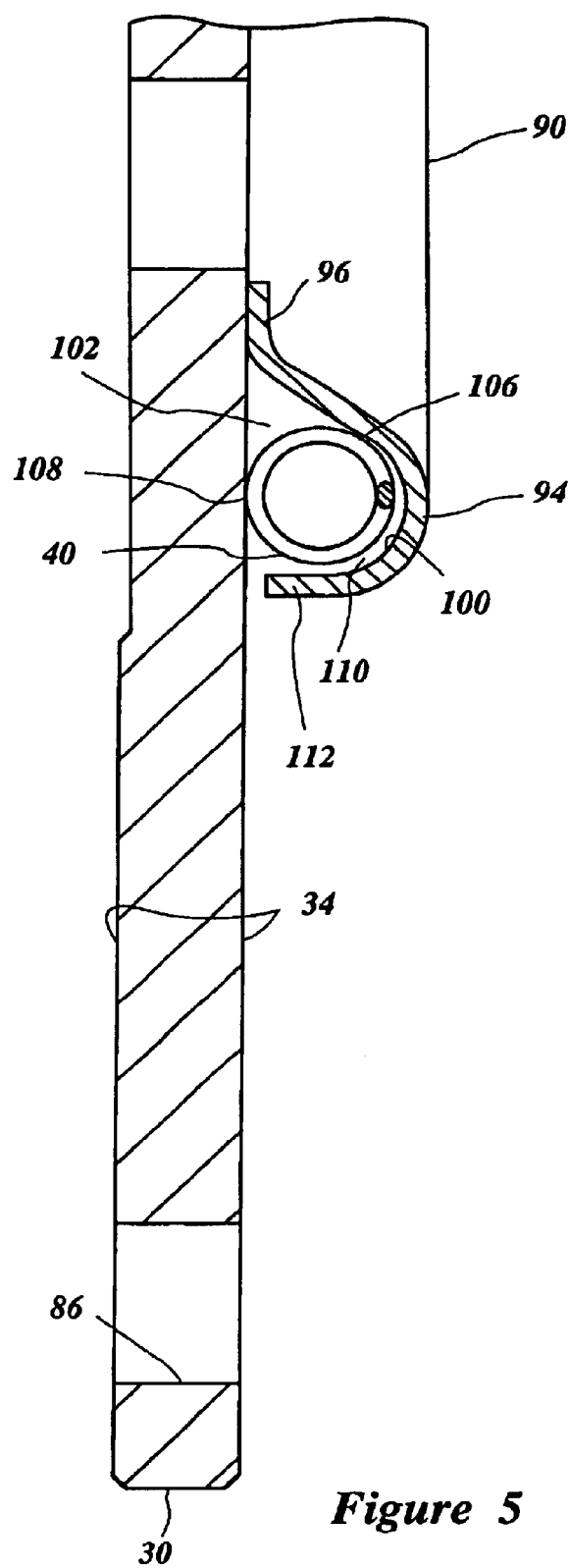
FIG. 5 is another partial cross-sectional view of the structure of FIG. 3 taken along the line 5—5 of FIG. 3.

Typically, circumferential side surfaces of the disc 30 define friction areas 34. The friction areas 34 are also illustrated in FIGS. 3–5 which show a modified structure and are described in greater detail with reference to FIGS. 3–5 below.

A caliper (not shown) is mounted to the motorcycle frame and incorporates a pair of brake pads that sandwich the friction areas 34 of the brake disk 30. A hydraulic brake system is provided to move the pads toward the disk 30 under control of the rider.

A brake lever coupled with the brake system preferably is attached to a handle bar of the motorcycle for control by the rider. When the rider takes firm hold of the brake lever, the hydraulic brake system pressurizes the pads to pinch the disk 30. Thereby, the disk 30 and the wheel coupled with the disk 30 are slowed or stopped, thereby causing the motorcycle to slow or stop.

When the brake disk 30 rotates, vibrations are generated, some of which can propagate through the disc 30 in a circumferential direction. This vibration can propagate at a natural frequency of the disk 30. Vibration of the disc 30 at one of its natural frequencies can generate brake squeak. The vibration inhibiting structure 32 inhibits the vibration and the brake squeak from occurring.

In the illustrated embodiment, the vibration inhibiting structure 32 comprises a spring holder 38 and a coil spring 40. The spring holder 38 is an annular support member and is configured as a ring-shape. That is, the illustrated holder 38 is circular. The holder 38 is affixed onto a side surface of the brake disk 30 by a plurality of (e.g., four, in this arrangement) bolts 42, which preferably are made of stainless steel.

The side surface where the holder 38 is affixed preferably is a surface facing the wheel hub, i.e., toward the wheel, so that the holder 38 is interposed between the wheel hub and the disk 30. This arrangement is advantageous because the vibration inhibiting structure 32 is concealed by the brake disk 30 and the good appearance of the motorcycle can be maintained. Advantageously, the motorcycle can include two disk brake assemblies, one on each side of the wheel. Thus, the structure 32 can be entirely concealed between two disks. The holder 38 preferably is positioned between the friction area 34 on this side and the center axis X.

The spring holder 38 preferably comprises a mount section or mounting portion 46 and a holder section 48 that extends from the mount section 46 radially outward from the mount section 46. The holder section 48 further comprises a bottom portion 50 and a side portion 52 that extends radially outwardly from the bottom portion 50. The bottom portion 50 has a pair of slant surfaces 54 facing towards each other and defining generally a v-configuration in a cross-section taken normal to the rotating direction of the disk 30 or along the plane extending through the axis X.

An outer end 58 of the side portion 52 preferably curves toward the disk 30, thus defining an arcuate cross-section. The holder 38 thus defines an annular groove or recessed portion 60 with the bottom portion 50 and the side portion 52 that opens outwardly but slightly narrowed between the outer end 58 and the disk 30. The illustrated holder 38 preferably is made of one piece of metal and is formed by any conventional manufacturing process such as, for example, a casting process. The metal can be iron alloy or aluminum alloy. However, stainless steel is the most appropriate if the brake disk 30 is made of stainless steel.

The coil spring 40 preferably is formed in a loop. An inner diameter of the spring 40, when in a relaxed state, preferably is slightly smaller than a diameter of the slant surfaces 54 of the bottom portion 50 of the ring-shape of the holder 38. An outer diameter of the coil spring 40 preferably is smaller than the narrowed distance between the outer end 58 of the holder 38 and the disk 30. The coil spring 40 preferably is made of stainless steel.

The coil spring 40 is a tension type. The spring 40 can thus be stretched to fit over the outer end 58. Then, by its own resilience, the spring 40 can contract to contact the bottom portion 50 of the holder 38 after loading. Due to its round cross-sectional shape, the spring 40 abuts the slant surfaces 54 at two points 64 along its outer diameter. The spring 40 thus is prevented from moving axially along the axis X. A curvature of the arched outer end 58 of the holder 38 preferably is determined to form a small space between the coil spring 40 and the outer end 58 of the holder 38. The small space allows the spring 40 to move in the circumferential direction; however, prevents the coil spring 40 from excessively floating from the bottom portion 50 by the centrifugal force.

A load rate or spring constant of the coil spring 40 is selected such that the spring 40 generates a tension that allows the spring 40 to move circumferentially or in the rotating direction of the disk 30 relative to the spring holder 38. The load rate (N/m) of the illustrated coil spring 40 is selected within a range of about 10 through 20 (N/m) per millimeter of length of the spring 40 when the spring 40 is in a relaxed state. For example, if the coil spring 40 is 100 mm long in a relaxed state, then the load rate preferably is about 1000 to 2000 (N/m).

Figure 2:
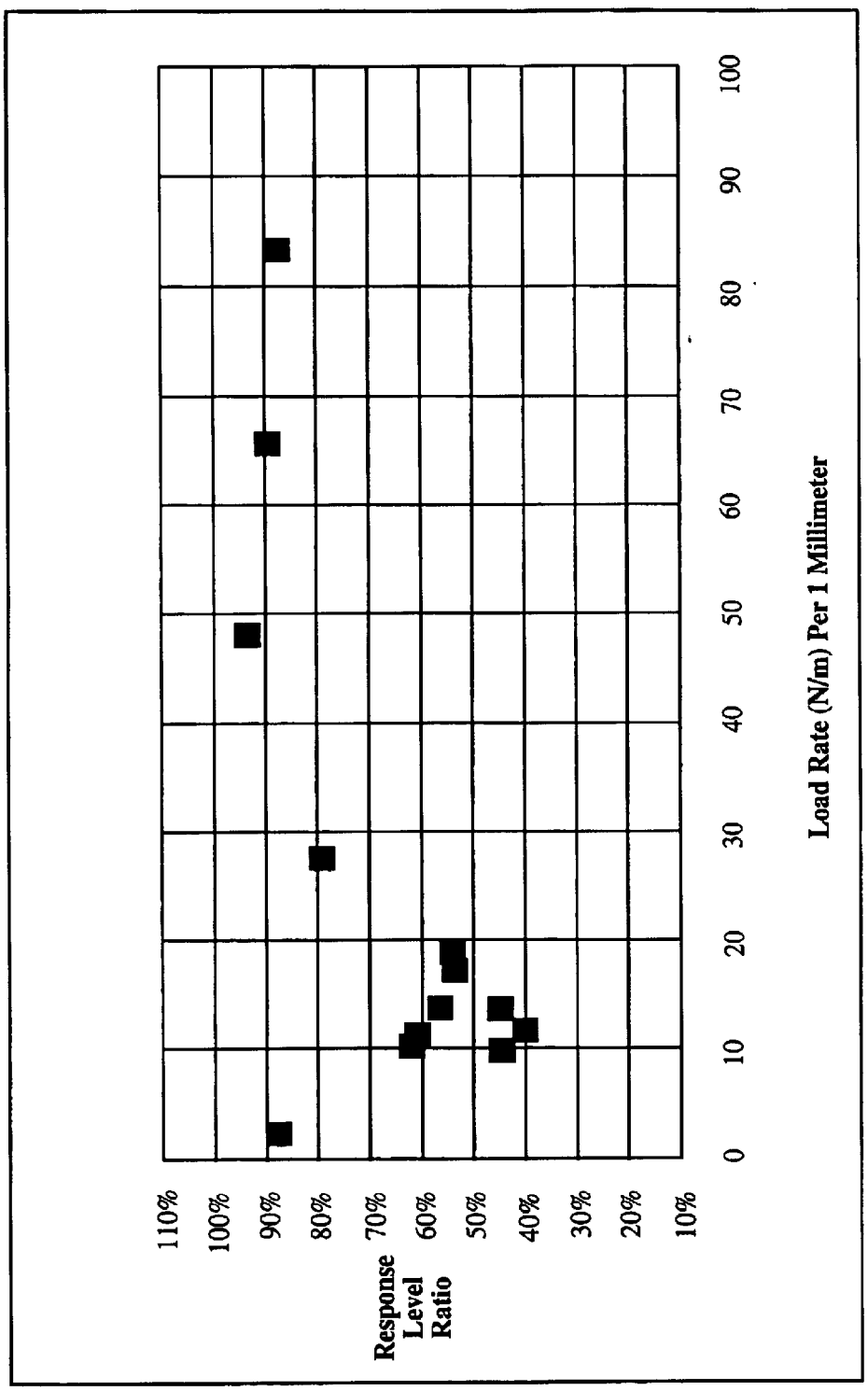
FIG. 2 is a graph illustrating response level ratios (%) versus load rates (N/m) of a coil spring. The load rate of the coil spring is represented as a function of the length of the spring in a relaxed state, i.e., per millimeter.

The range of the load rate is the optimum range obtained through experiments using various coil springs which have different load rates. FIG. 2 illustrates a result of the experiments and shows that response level ratios corresponding to the load rates 10 through 20 (N/m) are smaller than the other response level ratios. The term "response level ratio" in this description means a ratio of a vibration response level (magnitude of brake squeak sound) generated by a striking a brake disc before and after the coil spring is attached. In particular, the ratio is the result of dividing the response level generated by the test when the coil spring is attached by the response level generated without the coil spring attached. For instance, a response level ratio of 50% means that the sound volume of the brake disc vibration with the coil spring attached is reduced to 50% of the sound volume of the brake disc without the coil spring.

A coil spring 40 tensioned in the manner as described above allows the spring 40 to move circumferentially relative to the spring holder 38 when the disk 30 rotates. When vibration causing brake squeak occurs, the coil spring 40 also vibrates; however, the vibration of the spring 40 is phase shifted from the vibration of the disk 30 by a phase difference. The coil spring 40 thus causes some friction resisting the vibration of the disk 30. The vibration of the disk 30 decreases accordingly and thus attenuates brake squeak.

Because the brake squeak is inhibited by the mechanism described above, the vibration inhibiting structure 32 does not affect the natural vibration of the disk 30. Thus, the brake squeak corresponding to a relatively wide range of frequency of the vibration can be inhibited.

In addition, the tension of the coil spring 40 can generally uniformly act upon the whole circumferential areas of the spring holder 38. The brake squeak thus can be more efficiently inhibited rather than by the conventional structures described above.

In another illustrative, but non-limiting embodiment, the spring 40 is 600 mm long in a relaxed state, with a load rate of 10 to 20 (N/m) per millimeter. Thus, in this embodiment, the resulting load rate of the spring 40 is about 6000 to 12000 (N/m). Preferably, the holder 38 is sized such that when the spring 40 is received in the holder, as illustrated in FIG. 1, or as illustrated in FIGS. 4–7, described below, the spring 40 is stretched by about 5% to 10%. As such, the spring 40 can rotate as the disc 30 rotates and vibrates, and thus attenuate at least some of the vibrations which cause brake squeak.

FIGS. 3–5 illustrate a modified vibration inhibiting structure 80 applied to the brake disk 30 of the motorcycle. The same members or components as those shown in FIG. 1 are assigned the same reference numerals and will not be described again.

The brake disk 30 defines an opening 82 where the wheel hub (not shown) is fitted. The disk 30 is affixed to the wheel hub by bolts (not shown) at bolt holes 84 which are defined around the opening 82 with equal distance from each other.

The friction areas 34 are defined circumferentially so as to be positioned at the outer-most portion of the disk 30. The symbols "A" of FIG. 4 indicate the friction areas 34. The friction areas 34 are formed coaxially relative to the opening 82. Plural apertures 86 preferably are formed in the friction areas 34 to radiate heat generated when the brake pads pinch the friction areas 34 and also to allow water on the friction areas 34 to be removed.

The vibration inhibiting structure 80 in this arrangement is disposed between the axis X and the friction areas 34. More specifically, the structure 80 is formed next to the friction areas 34. Preferably, the structure 80 is closer to the friction areas 34 than to the opening 82. This arrangement also is true with the first embodiment of FIG. 1. Because the friction areas 34 occupy the outer-most portion of the disc 30, a conventional brake caliper and brake pads can be used. Accordingly, the brake caliper also can be mounted in a typical position. This arrangement thus can contribute to reduce costs.

The vibration inhibiting structure 80 generally comprises a spring holder 90 and the coil spring 40. The spring holder 90 is similar to the spring holder 38 of FIG. 1; however, the holder 90 has a slightly different configuration from the holder 38. The coil spring 40 can be the same as that of FIG. 1.

The spring holder 90 in this arrangement is an annular support member and has a ring-shape and comprises a flat section 92 and a protruding section 94. The flat section 92 preferably abuts on the side surface of the brake disk 30 opposite to the wheel hub. The illustrated flat section 92 defines six bracket portions or mounting portions 96 positioned at equal distances from one another. Six rivets 98, which preferably are made of stainless steel, penetrate rivet holes formed on the disk 30 and the bracket portions 96 to fix the holder 90 onto the disk 30. The protruding section 94 defines an annular recess or recessed portion 100 that forms a semi-enclosed cavity 102 between the holder 90 and the disk 30.

The coil spring 40 is enclosed in the cavity 102. Because of its own tension, the spring 40 abuts the holder 90 at a point 106 (FIGS. 4 and 5) and the disk 30 at a point 108 in the cross section. A space 110 preferably is defined between the spring 40 and an outer end 112 of the holder 90 to allow the spring 40 more freedom in moving in the rotating direction and to prevent the spring 40 from excessively floating from the illustrated position by centrifugal force generated during operation.

The illustrated spring holder 90 preferably is made of a sheet metal and is formed by a press process. The sheet metal preferably is stainless steel, which is also preferably used for the disk 30, rivets 98 and the coil spring 40. Because the components of the vibration preventing structure 80 are made of the same material, i.e., stainless steel, electrolytic corrosion can be effectively prevented. In addition, because stainless steel is a rust-proof material, the good appearance of the brake disk 30 and adjacent components can be maintained. This advantage also is true with the arrangement of FIG. 1 where all of the components of the vibration inhibiting structure 32 are made of stainless steel.

In one exemplary method of mounting this arrangement, the coil spring 40 is first positioned in the recess 100 of the holder 90. The holder 90 is then affixed to the disk 30 by the rivets 98. As such, the coil spring 40, holder 90 and the disc 30 can be assembled as a unit, and then later attached to a hub of a wheel. Thus, manufacture and assembly of the wheel and disc brake can be performed at a different location or time.

Alternatively, stainless steel bolts can replace the rivets 98. This alternative can make loading and unloading of the spring 40 to and from the brake disk 30 easier.

The outer end 112 of the holder 90 can be smaller than that shown in FIG. 4 so that a gap is made between the outer end 112 and the disk 30 and the gap has a size large enough to allow the coil spring 40 to pass through. In this alternative, the spring 40 can be loaded after the holder 90 is affixed to the disk 98. Also, the holder formed by the press process can contribute for cost reduction.

If the brake disk is a floating type, the holder can be joined together with an annular friction plate using floating pins. The floating-type brake disk comprises the annular friction plate defining the friction areas and an inner circular disk coupled with the wheel hub. The annular friction plate is connected to the inner disk by the floating pins so that the friction plate can float relative to the inner disk. Because the floating pins are used for joining the holder, no special fasteners such as the rivets or bolts are necessary.

Figure 6:
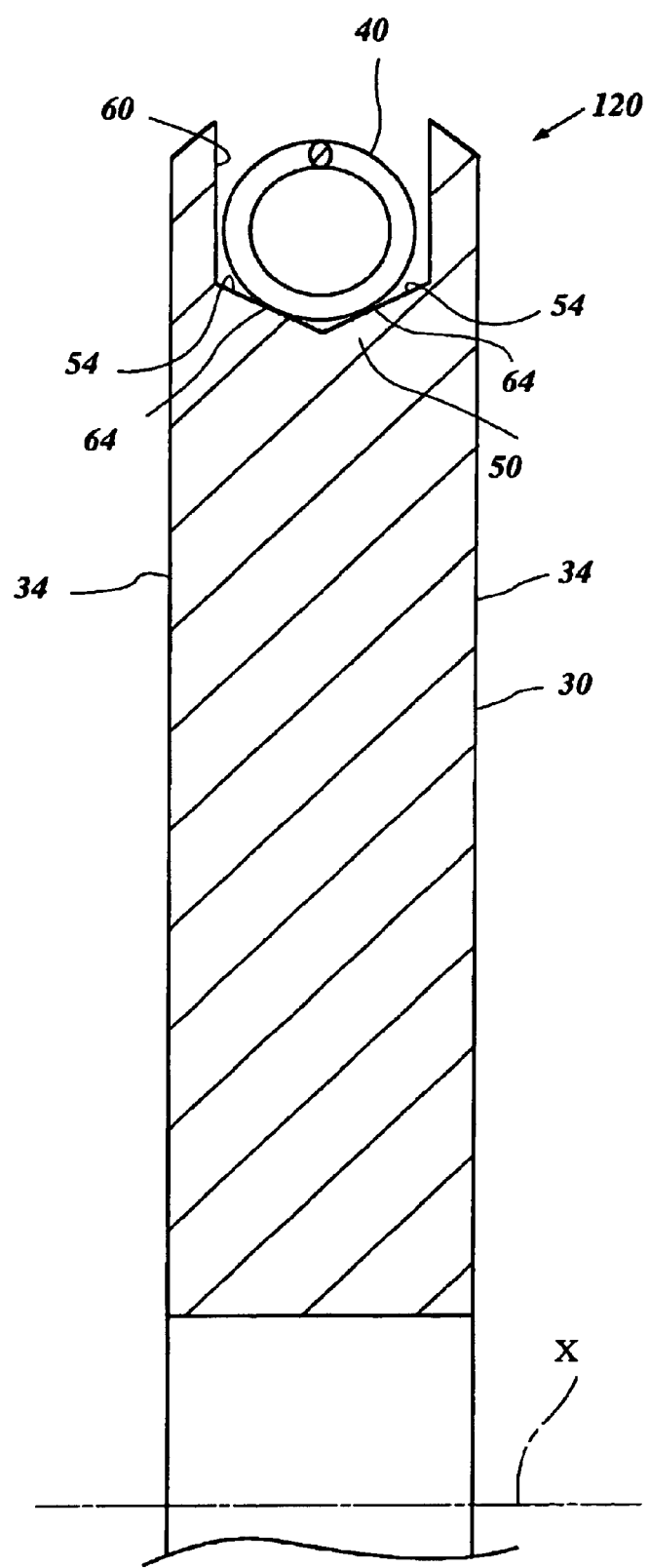
FIG. 6 is a partial cross-sectional view of another vibration inhibiting structure for a brake disk of a motorcycle configured in accordance with another embodiment. The cross-section is taken along a plane extending through the center axis of the brake disk.

FIG. 6 illustrates another modified vibration inhibiting structure 120 applied to the brake disk 30 of a motorcycle. The same members or components as those shown in FIG. 1 and/or FIGS. 3–5 are assigned the same reference numerals and will not be described again.

The vibration inhibiting structure 120 is disposed on the brake disk 30, and, more specifically, on the circumferential edge of the disk 30. That is, the disk 30 defines the annular groove 60 and serves as the spring holder. In this embodiment, the spring holder thus is positioned farther from the axis X than the friction areas 34. The bottom portion 50 of the groove 60 defines the V-configured slant surfaces 54. The coil spring 40 is loaded onto the slant surfaces 54. The spring 40 abuts the surfaces 54 at the points 64, which are two, in the cross-section.

Figure 7:
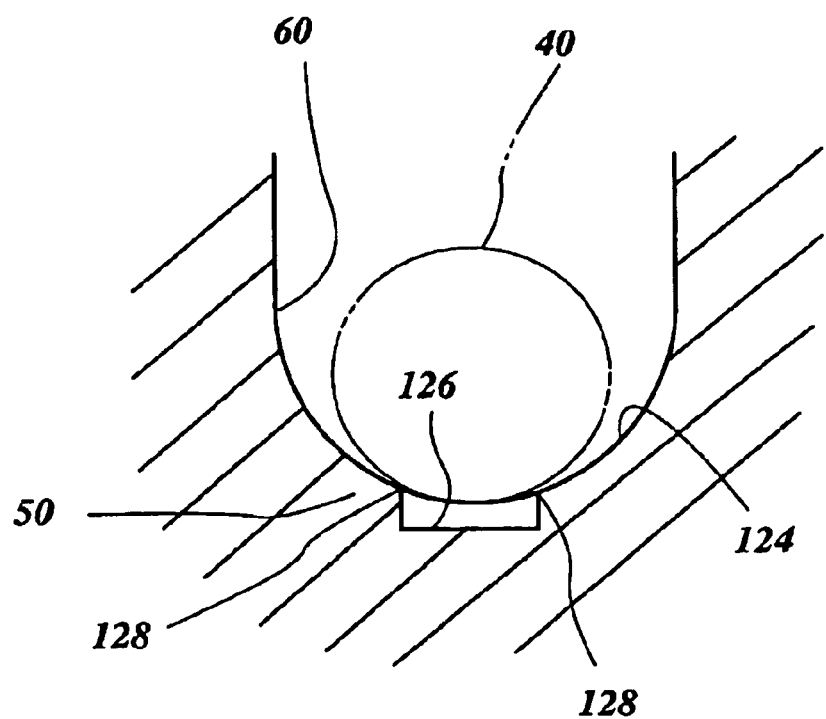
FIG. 7 is a partial cross-sectional view of an alternative arrangement of the vibration inhibiting structure of FIG. 6.

With reference to FIG. 7, the V-configuration of the bottom portion 50 can be replaced by an arched surface 124 and a small annular groove 126. The arched surface 124 preferably has a larger radius of curvature than that of the coil spring 40. The small groove 126 is generally formed at a center portion of the bottom portion 50. The coil spring 40 abuts the bottom portion 50 at two points 128 in the cross-section where outer edges of the small groove 126 meet the arched surface 124.

The arrangements shown in FIGS. 6 and 7 allow the brake disk 30 to form a relatively large diameter holder. The coil spring 40 thus has a larger spring capacity accordingly. In addition, because neither specific spring holder nor fasteners such as rivets or bolts are necessary, the brake disk can be lighter and be produced with less cost.

Generally, such brake disks are subjected to frequent heat cycles through repeated contact with brake pads. The coil spring made of metal is advantageous because a metal spring is better able to withstand such heat cycling. In addition, even if the brake disk expands with the heat, the coil spring can follow the expansion. If, however, the spring is loaded onto a rotor that does not produce such heat, other springs made of other materials such as, for example, elastic member made of rubber can be used.

The endless coil spring can be replaced by other springs. For example, a coil spring that has two distal ends can be used. In this alternative, the distal ends can have, for example, hooks that can engage with each other so as to substantially make the spring endless.

Of course, the foregoing description is that of preferred controls having certain features, aspects and advantages in accordance with the present invention. Various changes and modifications also may be made to the above-described controls without departing from the spirit and scope of the invention, as defined by the claims.

What is claimed is:

1. A rotor mounted for rotation about an axis, the rotor comprising a hub mounting portion and a disk extending from the hub mounting portion, the hub mounting portion adapted for connecting the disk portion to a hub, the disk having at least one surface facing toward the axial direction of the axis and a peripheral edge facing toward a radial direction relative to the axis, a holder separate from the hub mounting portion being attached to the at least one surface of the disk at a position spaced from the hub mounting portion and extending in a rotating direction of the disk, an annular resilient member extending along the holder, the resilient member being loaded onto the holder by its own resilience, the resilient member having a load rate that generates a tension and allows the resilient member to move in the rotating direction relative to the holder, the resilient member being disposed between the holder and the at least one surface.

2. The rotor as set forth in claim 1, wherein the holder has a recess, the resilient member is disposed in the recess.

3. The rotor as set forth in claim 2, wherein the resilient member contacts the holder and the disk.

4. The rotor as set forth in claim 2, wherein the recess generally encloses the resilient member between the disk and the recess.

5. The rotor as set forth in claim 1, wherein the resilient member abuts the holder at least at two points in a cross-section taken normal to the rotating direction.

6. The rotor as set forth in claim 5, wherein the resilient member has a round shape in the cross-section, the holder having a V-configuration in the cross-section to define a pair of slant surfaces facing toward each other, the resilient member being positioned on the slant surfaces.

7. The rotor as set forth in claim 1, wherein the resilient member comprises a coil spring.

8. The rotor as set forth in claim 1, wherein the resilient member comprises an annular configuration in a cross-section taken normal to the at least one surface of the disk, the holder having a V-configuration in said cross-section to define a pair of slant surfaces facing toward each other, the resilient member being positioned on the slant surfaces.

9. The rotor as set forth in claim 1, wherein the load rate includes a load rate selected within a range of 10 to 20 Newtons per meter, per millimeter of length of the annular resilient member.

10. The rotor as set forth in claim 1, wherein the holder comprises an annular support member affixed to the disk.

11. The rotor as set forth in claim 1, wherein the resilient member is interposed between the holder and the disk.

12. The rotor as set forth in claim 1, wherein the resilient member contacts the holder and the disk.

13. A brake disk assembly for a vehicle comprising a hub mounting portion and a disk extending from the hub mounting portion and having a peripheral edge and at least one side surface, the at least one side surface facing toward an axial direction of the disk, a spring holder being directly attached to the at least one side surface of the disk and circumferentially extending around an axis of the disk, and a spring extending around the axis and along the spring holder, the spring holder and spring being spaced from the hub mounting portion, the spring being loaded onto the spring holder by its own resilience, the spring having a load rate that generates a tension that allows the spring to move circumferentially relative to the spring holder.

14. The brake disk assembly as set forth in claim 13, wherein the disk defines a friction area, and the spring holder is positioned between the axis and the friction area.

15. The brake disk assembly asset forth in claim 14, wherein the spring holder comprises an annular support member affixed to the at least one side surface of the disk, and the annular support member extends in an area that is closer to the axis than the friction area.

16. The brake disk assembly as set forth in claim 13, wherein the spring abuts the spring holder at least at two points in a cross-section taken normal to a plane including the axis.

17. The brake disk assembly as set forth in claim 13, wherein the disk is adapted to be affixed to a wheel of the vehicle, and the spring holder is disposed on a side of the disk that faces the wheel.

18. The brake disk assembly as set forth in claim 13, wherein the spring is interposed between the spring holder and the disk.

19. The brake disk assembly as set forth in claim 13, wherein the spring contacts the spring holder and the disk.

20. The brake disk assembly as set forth in claim 13, wherein the spring holder has a recess, and the spring is disposed in the recess.

21. A disk brake assembly for a vehicle comprising a wheel connecting portion and a disk extending from the wheel connecting portion, the disk defining a rotational axis and having a peripheral portion facing toward a radial direction relative to the axis and at least one side surface facing toward an axial direction relative to the axis, the wheel connecting portion being adapted to be rotationally coupled to a wheel of the vehicle, a holder separate from the wheel connecting portion and being attached to the side surface of the disk, and a vibration attenuation member contacting the holder, the holder and the vibration attenuation member being spaced from the wheel connecting portion, and including means for biasing the member into contact with the holder and allowing the member to rotate relative to the holder.

22. The assembly according to claim 21, wherein the holder comprises a mounting portion and a recessed portion, the recessed portion being configured to at least substantially enclose the attenuation member between the disk and the recessed portion.

23. A rotor mounted to a rotating member for rotation about an axis, the rotor comprising a rotating member connecting portion and a disk extending from the rotating member connecting portion, the disk defining a rotational axis and having a peripheral portion facing toward a radial direction relative to the axis and at least one side surface facing toward an axial direction relative to the axis, a holder extending in a rotating direction of the disk and being connected to the side surface of the disk, an annular resilient member being in a position between the side surface of the disk and the holder, the resilient member and the holder being spaced from the rotating member connecting portion, the resilient member being loaded onto the position by its own resilience, the resilient member having a load rate that generates a tension and allows the resilient member to move in the rotating direction relative to the holder.

* * * * *

UNITED STATES PATENT AND TRADEMARK OFFICE
CERTIFICATE OF CORRECTION

| | | |
|---|---|---|
| PATENT NO. | : 6,913,124 B2 | Page 1 of 1 |
| APPLICATION NO. | : 10/227260 | |
| DATED | : July 5, 2005 | |
| INVENTOR(S) | : Toshio Tanaka et al. | |

It is certified that error appears in the above-identified patent and that said Letters Patent is hereby corrected as shown below:

On Title page item (56) References Cited, please insert --US2002/0007995A1 Turos--

Signed and Sealed this

Thirteenth Day of March, 2007

JON W. DUDAS
*Director of the United States Patent and Trademark Office*